Sept. 9, 1924.
M. OLESEK
1,507,850
TRUNDLING TOY
Filed Nov. 18, 1922
FIG. 1.
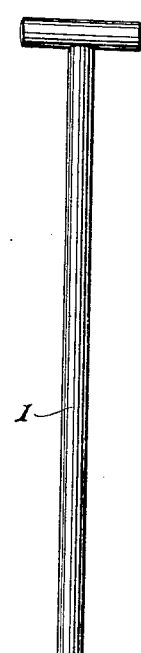
FIG. 2.
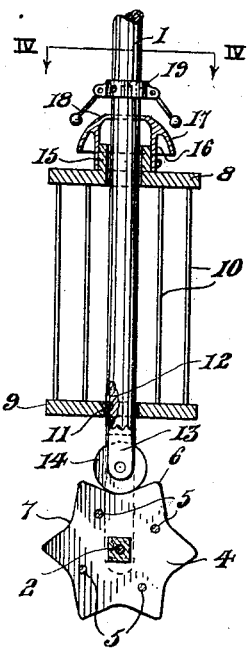
FIG. 3.
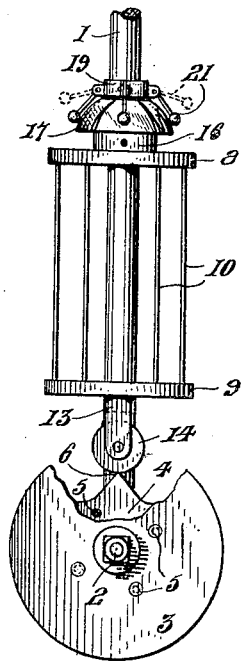
FIG. 6.
FIG. 4.
FIG. 5.
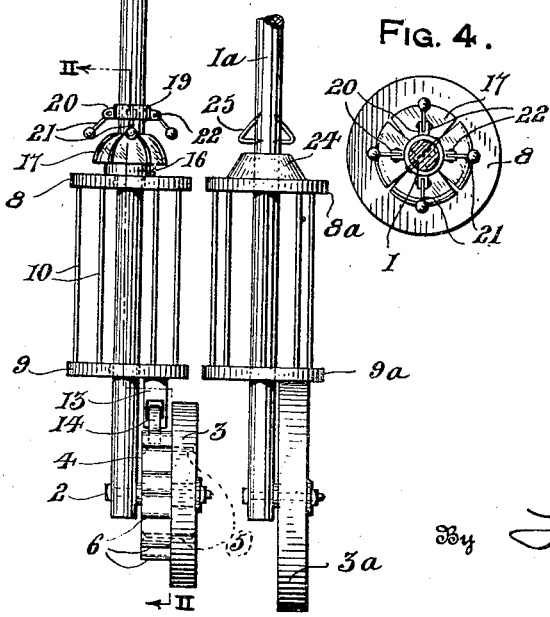
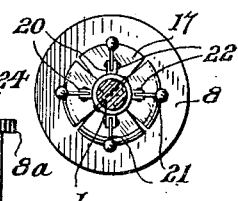
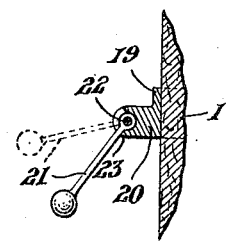
Inventor
M. Olesek
By F. K. Bryant
Attorney Patented Sept. 9, 1924.

1,507,850

UNITED STATES PATENT OFFICE.

MIKE OLESEK, OF CHEBOYGAN, MICHIGAN.

TRUNDLING TOY.

Application filed November 18, 1922. Serial No. 601,744.

*To all whom it may concern:*

Be it known that I, MIKE OLESEK, a citizen of Poland, residing at Cheboygan, in the county of Cheboygan and State of Michigan, have invented certain new and useful Improvements in Trundling Toys, of which the following is a specification.

This invention relates to certain new and useful improvements in trundling toys wherein a ground engaging roller journaled laterally of one end of the relatively long handle is adapted for engagement with a bottom disk of a cylindrical cage that is journaled on the handle rod for rotating the same during trundling of the toy.

A further object of the invention is to provide a trundling toy of the type above set forth, wherein cooperating devices are carried by the ground engaging wheel and the cage to effect sliding movement of the cage upon the handle rod, a bell being carried by the upper end of the cage to be moved into engagement with pivoted hammer arms carried by the handle rod for sounding the bell upon sliding movement of the cage.

With the above general objects in view and others that will appear as the nature of the invention is better understood, the same consists of the novel form, combination and arrangement of parts hereinafter more fully described, shown in the accompanying drawing and claimed.

In the drawing, wherein like reference characters designate corresponding parts throughout the several views, Figure 1 is a front elevational view of a trundling toy constructed in accordance with the present invention showing the relatively long handle rod supporting the cage, the bell and striker arms carried by the cage and handle rod respectively and the cooperating devices carried by the cage and trundling wheel for effecting sliding movement of the cage on the handle bar, Figure 2 is a longitudinal sectional view taken on line II—II of Fig. 1 showing the sliding cage at its limit of downward movement with the bearing roller carried by the lower end thereof positioned in a crotch between adjacent points of the star wheel with the bell carried by the upper end of the cage spaced from the pivoted hammer, Figure 3 is a fragmentary side elevational view with the trundling wheel partially broken away showing the cage and bearing roller carried thereby elevated by one of the points of the star wheel with the bell moved into engagement with the striker hammers, Figure 4 is a horizontal sectional view taken on line IV—IV of Fig. 2, Figure 5 is a detail sectional view showing the mounting for one of the bell hammers, and Figure 6 is a fragmentary front elevational view of a modified form of the invention showing the rotatable cage directly engaging the trundling wheel.

Referring more in detail to the accompanying drawing, there is illustrated a trundling toy embodying a relatively long trundling toy embodying a laterally projecting handle bar 1 carrying a laterally projecting shaft 2 at the lower end thereof upon which a trundling wheel 3 is journaled. A star wheel 4 bolted as at 5 to a side face of the trundling wheel 3, intermediate said wheel and the adjacent end of the handle bar 1 for purposes presently to appear, the star wheel 4 including spaced points 6 and intermediate crotched portions 7 as clearly shown in Fig. 2.

The cage is mounted upon the handle bar 1, the same embodying upper and lower disk members 8 and 9 respectively that are connected by a plurality of cage bars 10 positioned adjacent the peripheral edges thereof, the disk members 8 and 9 being provided with axial openings to permit free sliding movement of the cage upon the handle bar. The wall of the opening in the disk member 9 is provided with a key 11 that extends into a longitudinal spline 12 formed in the adjacent portion of the handle bar 1 which will permit free sliding movement of the cage upon the handle bar and prevent rotation thereof, this construction being clearly shown in Fig. 2.

The connection between the cage member and the star wheel 4 embodies a block 13 depending from the disk member 9 in the lower end of which a bearing roller 14 is journaled for riding over the periphery of the star wheel 4 as illustrated, rotation of the trundling wheel 3 effecting rotation of the star wheel 4 for raising and lowering the cage as illustrated in Figs. 2 and 3 by the bearing roller 14 successively riding over the point 6 of the star wheel and received in the crotch portions 7.

The upper disk member 8 carries an upwardly directed apertured boss 15 surrounding the central opening in said disk member for the passage of the handle bar, and to which a collar 16 carried by a bell 17 is anchored, the bell having a central opening 18 through which the handle bar projects. A collar 19 is anchored to the handle bar 1 at a point slightly above the bell 17 as shown in Fig. 2, the same carrying a plurality of outwardly directed lugs 20 to which striking hammers 21 are pivoted as at 22, downward movement of the hammers being limited by shoulders 23 formed at the lower outer edges of the lugs 20 as shown in Fig. 5.

In the operation of the device, rotation of the trundling wheel 3 causes the star wheel 4 to rotate therewith effecting sliding or reciprocating movements of the cage upon the handle bar by the bearing roller 14 carried by the cage engaging the periphery of the star wheel as shown in Figs. 1 to 3, upward movement of the cage causing the bell 17 to strike the hammers 21 to ring the same, the cage falling by its own weight when the bearing roller passes over one of the points 6 to be received in the crotch portion 7.

In the form of the invention shown in Fig. 6, the handle bar 1ª has a trundling wheel 3ª journaled laterally thereof and in direct engagement with the disk member 9ª of the cage that is rotatable upon the handle bar 1ª, the upper disk 8ª of the cage member carrying an upwardly directed collar 24 that is adapted to engage the pin members 25 carried by the handle bar for limiting upward movement thereof and also for retaining the same in engagement with the trundling wheel 3ª. In this form of the invention, the cage is constantly rotatable by frictional engagement with the periphery of the trundling wheel 3ª.

While there are herein shown and described the preferred embodiments of the present invention, it is nevertheless to be understood that minor changes may be made therein without departing from the spirit and scope of the invention as claimed.

What is claimed as new is:—

1. In a trundling toy, a handle bar, a trundling wheel journaled laterally of the outer end thereof, a cage slidably mounted upon the handle bar, cooperating means carried by the cage and trundling wheel to effect reciprocating movement of the cage upon rotation of the trundling wheel, and a bell and striker hammers carried by the upper end of the cage and handle bar respectively.

2. In a trundling toy, a handle bar, a trundling wheel journaled laterally of the outer end thereof, a cage slidably mounted upon the handle bar, cooperating means carried by the cage and trundling wheel to effect reciprocating movement of the cage upon rotation of the trundling wheel, said means including a star wheel fixed to a face of the trundling wheel intermediate the trundling wheel and the adjacent end of the handle bar, and a bearing roller carried by the cage in engagement with the periphery of the star wheel.

3. In a trundling toy, a handle bar, a trundling wheel journaled laterally of the outer end thereof, a cage slidably mounted upon the handle bar, cooperating means carried by the cage and trundling wheel to effect reciprocating movement of the cage upon rotation of the trundling wheel, said means including a star wheel fixed to a face of the trundling wheel intermediate the trundling wheel and the adjacent end of the handle bar, and a bearing roller carried by the cage in engagement with the periphery of the star wheel, said cage being splined on the handle bar to prevent rotation thereof.

In testimony whereof I affix my signature.

MIKE OLESEK.